United States Patent [19]
Rebello et al.

[11] Patent Number: 5,117,347
[45] Date of Patent: May 26, 1992

[54] FULL DUTY CYCLE FORWARD CONVERTER

[75] Inventors: Peter Rebello, Huntington Beach; Lateef Kajouke, Pasadena, both of Calif.

[73] Assignee: Teledyne Industries, Inc., Los Angeles, Calif.

[21] Appl. No.: 521,759

[22] Filed: May 10, 1990

[51] Int. Cl.$^5$ .................................... H02M 3/335
[52] U.S. Cl. .................................... 363/56; 363/21; 363/97; 363/16
[58] Field of Search .................... 363/16, 20, 21, 56, 363/131, 97

[56] References Cited

U.S. PATENT DOCUMENTS

| | | | |
|---|---|---|---|
| 4,675,796 | 6/1987 | Gautherin et al. | 363/134 |
| 4,760,512 | 7/1988 | Loftus | 363/20 |
| 4,783,727 | 11/1988 | Neumann | 363/20 |

Primary Examiner—Peter S. Wong

[57] ABSTRACT

This invention discloses apparatus and methods for increasing the duty cycle of forward converters up to 90 percent by adding a quasi-resonant network to the primary circuit. The quasi-resonant network removes the parasitic energy from the primary winding of the transformer during the OFF period of the forward converter. The parasitic energy is stored in a capacitor in the quasi-resonant network. A portion of the stored energy is recovered and transferred back to the input energy source. The increased duty cycle enables the forward converter to maintain a substantially constant output voltage over a wide range of input voltages. In addition, the invention requires less parts and is thus more reliable than previous energy recovery networks. It contains no resistors, which accounts for less loss. It also causes less electromagnetic interference than other methods.

34 Claims, 3 Drawing Sheets

FULL DUTY CYCLE FORWARD CONVERTER

BACKGROUND OF THE INVENTION

1. Field of the Invention

The invention relates generally to forward converters, and in particular, to a forward converter that operates beyond the customary 50 per cent duty cycle limit.

2. Description of the Related Art

Forward converters are used to transfer input power, the product of a defined input voltage and current, to an output providing substantially the same amount of power, the product of a desired output voltage and current. Typically, forward converters consist of a transformer having a primary winding connected to a primary circuit including input terminals for connection to the input energy source, and one or more secondary windings connected to a secondary circuit including output terminals for connection to the load. The primary circuit includes a transistor switch, which in operation, controls the application of the input energy to the primary winding of a transformer, alternating between an ON period and an OFF period, at a predetermined rate and duration. "Buck converters" are forward converters which transfer power from the primary circuit to the secondary circuit during the ON period.

At each ON period, current flows from the input energy source through the primary winding of the transformer, creating a magnetizing inductance in the core of the transformer. As a result, during the OFF period, parasitic energy is present in the transformer resulting from leakage inductance and magnetizing inductance. This parasitic energy must be removed from the transformer before the subsequent ON period.

Until now, the parasitic energy was removed from the transformer by employing snubbers, energy recovery networks and demagnetizing windings. However, these means limit the maximum duty cycle of forward converters to about 50 per cent.

It would be advantageous to produce forward converters with duty cycles up to 90 per cent, that operate over a wider range of input voltages, uses simpler components which would increase reliability and reduce power loss.

SUMMARY OF THE INVENTION

In accordance with the invention, apparatus and methods for increasing the duty cycle of forward converters up to 90 per cent are disclosed in which a quasi-resonant network is added to the primary circuit. The quasi-resonant network removes the parasitic energy from transformer during the OFF period of the forward converter, enabling the forward converter to operate at an increased duty cycle. The parasitic energy is stored in a capacitor in the quasi-resonant network. A portion of the stored energy is recovered and returned to the input energy source. The balance of the stored energy is discharged at the start of the next ON period.

The maximum duty cycle for a forward converter is a function of the characteristics of the power supply circuit and the transformer in the circuit. With each ON period, current flowing through the primary winding of the transformer results in a magnetizing inductance and a leakage inductance in the transformer. At the subsequent OFF period, the magnetizing inductance and leakage inductance constitute parasitic energy that must be removed from the transformer, thus resetting the transformer before the next ON period.

The quasi-resonant network of the invention provides improved means for removing the parasitic energy from the core of the transformer. The quasi-resonant network has three major advantages:

First, the quasi-resonant network removes the parasitic energy much faster than any previous means. The effect is that the transformer, which must be reset during the OFF period, is reset in a much shorter period of time. By decreasing the length of time required for resetting the transformer, the OFF period is shortened. As a result, the duty cycle of the forward converter, that is the ratio of the ON period to the sum of the On period and the OFF period, is substantially increased, say from 50 per cent to 60 per cent, 70 per cent, 80 per cent, 90 per cent, or more. The advantage of the increased duty cycle is that the output from the forward converter can be maintained over a wider range of input voltages.

Second, there is less energy loss associated with the quasi-resonant network than with conventional snubbers and energy recovery networks. Snubbers and energy recovery networks commonly employ resistors which account for the greater energy loss. The quasi-resonant network uses only a capacitor and two diodes, in conjunction with the primary winding of the transformer.

Third, the components used in the quasi-resonant network are fewer in number, resulting in increased reliability as compared to snubbers and energy recovery networks with more components.

BRIEF DESCRIPTION OF THE DRAWINGS

The various features and advantages of the present invention are apparent in light of the following detailed description taken together with the accompanying drawings, in which.

DESCRIPTION OF THE PREFERRED EMBODIMENTS

Figure 1:
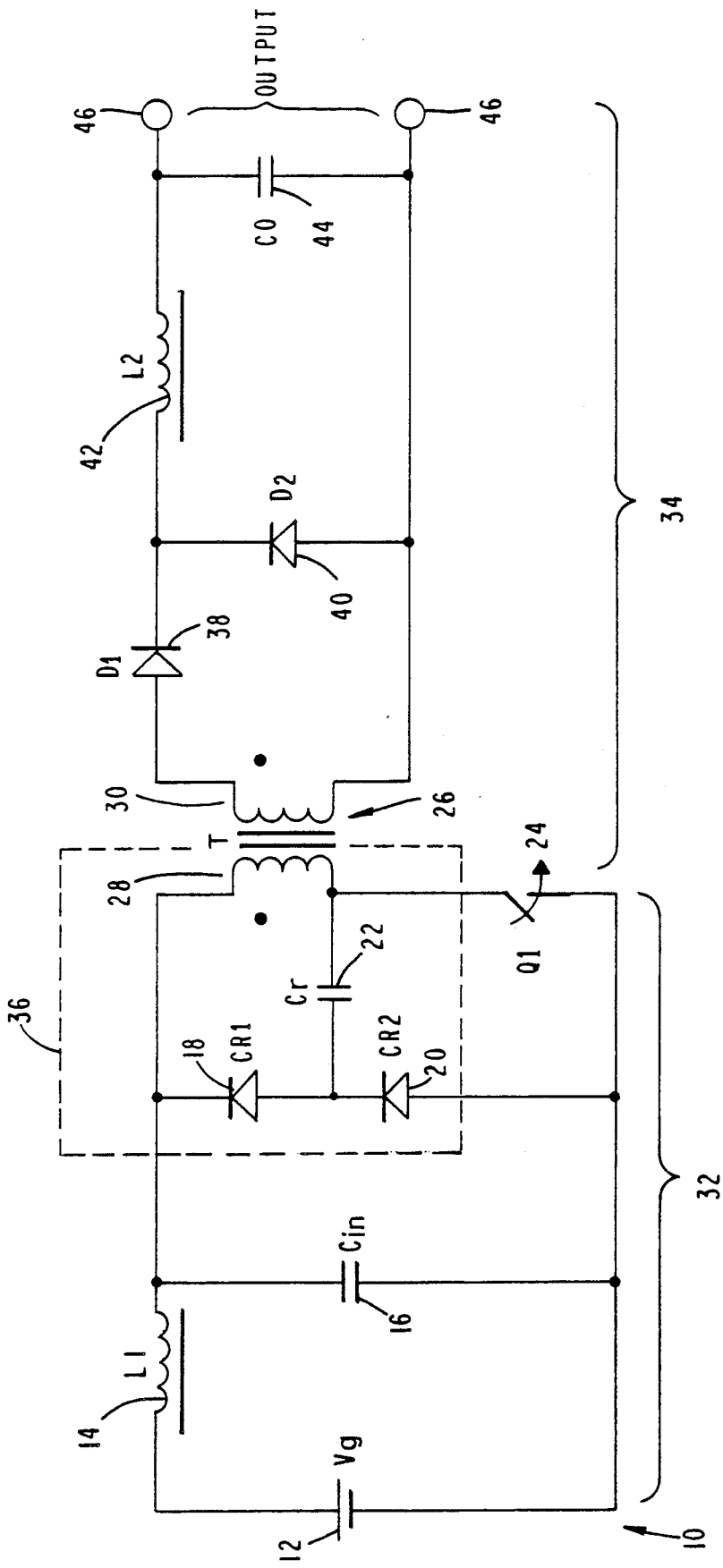
FIG. 1 is a schematic diagram of a forward converter with the quasi-resonant circuit.

Methods and apparatus are presented in accordance with the invention for increasing the duty cycle of forward converters up to 90 per cent, in which a quasi-resonant network is added to the primary circuit. FIG. 1 shows a forward converter 10 consisting of a transformer 26 having a primary winding 28 coupled to a primary circuit 32, and a secondary winding 30 coupled to a secondary circuit 34.

The primary circuit 32 comprises a first inductor 14, a first lead of said first inductor 14 being coupled at a first lead to an input energy source 12 and a second lead of said first inductor 14 being coupled to a first lead of a first capacitor 16, and a first lead of said primary winding 28. A second lead of said first capacitor 26 is connected to a second lead of said input energy source 12 and a first lead of a transistor switch 24. A second lead of said transistor switch 24 is coupled to a second lead of said primary winding 28.

The quasi-resonant network 36 comprises a first diode 18, a first lead of said first diode 28 being coupled to said second lead of said first inductor 14, said first lead of said first capacitor 16, and said first lead of said primary winding 28. A second lead of said first diode 18 is coupled to a first lead of a second diode 20 and a second lead of a resonant capacitor 22, a first lead of said resonant capacitor 22 being coupled to said second lead of said primary winding 28, and second lead of said transistor switch 24.

The secondary circuit 34 of the forward converter 10, coupled to said secondary winding 30 comprises a third diode 38, a fourth diode 40, a second inductor 42, an output capacitor 44, and a pair of output terminals 46 adapted for connection to a load. A first lead of said third diode 38 is coupled to a first lead of said secondary winding 30, a second lead of said third diode 38 is coupled to a first lead of said fourth diode 40 and a first lead of said second inductor 42. A second lead of said second inductor 42 is coupled to a first lead of said output capacitor 44 and a first output terminal of said pair of output terminals 46. A second lead of said fourth diode 40 is coupled to a second leads of said secondary winding 30, a second lead of said output capacitor 44, and a second output terminal of said pair of output terminals 46.

In operation, the transistor switch 24 of the forward converter is opened and closed at a desired rate. The duration of the ON period, that is when transistor switch 24 is closed, in ratio to the switching period which is equal to the inverse to the desired opening and closing rate of the transistor switch 24 determines the duty cycle. During the ON period, power is transferred from the input energy source 12, through the primary circuit 32 and the primary winding 28 to the secondary winding 30 and the secondary circuit 34 to a load connected to the output terminals 46.

During the ON period, magnetizing inductance and leakage inductance energy are generated in the transformer 26. At the end of the ON period, the magnetizing inductance and leakage inductance energy remain in the transformer and must be removed during the OFF period. Proceeding with the next ON period without first removing the magnetizing inductance and leakage inductance energy remaining from the previous ON period will send the transformer 26 into saturation. The quasiresonant network 36 removes the parasitic magnetizing and leakage inductance energy during the OFF period, recovering part of that energy for use during the next ON period.

When the transistor switch 24 opens at the end of the ON period, a current through the primary winding 28, resulting from the leakage inductance and magnetizing inductance, charges the resonant capacitor 22 as the current flows around the loop comprising the resonant capacitor 22, the first diode 18, and the primary winding 28. (Although it is possible for the resonant capacitor 22 to have some small positive voltage across it at the end of the ON period, due to charge up via the parasitic capacitance of the first diode 18 and the transistor switch 24, the voltage across the resonant capacitor 22 at the end of the ON period is assumed to be zero.) As the current flowing in the loop charges the resonant capacitor 22, energy is transmitted to the secondary winding 30, and thus the output, via the transformer 26 and the conduction of the third diode 38.

When the resonant capacitor 22 has charged up to its peak value, no current flows through the primary winding 28 and the third diode 38 no longer conducts. Therefore, at that point during that OFF period, no further energy is transmitted to the output through the secondary winding 30 and the fourth diode 40 begins conducting.

The polarity of the fully charged resonant capacitor 22 is now opposite of the polarity during the ON period. In preferred embodiments, the value of the resonant capacitor 22 is chosen such that the voltage across said resonant capacitor 22 when fully charged is substantially greater than the voltage across the input energy source 12. Therefore, energy stored in the resonant capacitor 22 is transferred to the first capacitor 16 via a loop comprising the first capacitor 16, the second diode 10, the resonant capacitor 22, and the primary winding 28. With the second diode 20 conducting, current flows around the loop charging the first capacitor 16 until the voltage across the resonant capacitor 22 is substantially equal to the voltage across the first capacitor 16 plus the voltage across the second diode 20. Thus, the energy now stored by the first capacitor 16 has been recovered for use during the next ON period. The small amount of energy remaining in the resonant capacitor 22 discharges across the second diode 20 at the closure of the transistor switch 24 at the next ON period.

In preferred embodiments, the design parameters are formulated as follows:

$$D_{max} = 1 - (f_s/2f_0)$$

where:

$D_{max}$ is the maximum duty cycle;
$f_o$ is the quasi-resonant frequency;
$f_s$ is the switching frequency.

The quasi-resonant frequency is determined by:

$$f_0 = 1/2\pi(LC)^{0.5}$$

where:

L is the sum of the magnetizing inductance of the transformer 26, $L_m$, plus the leakage inductance of the transformer 26, $L_w$; and C is the sum of the capacitance of the resonant capacitor 22, $C_s$, plus the parasitic capacitance of said first diode 18, $C_p$.

The corresponding peak voltage across the resonant capacitor 22 is determine by equating the circuit inductive energy to the amount of energy absorbed by the resonant capacitor 22 according to:

$$VC_{sp}^2 = 1/C_s(L_m I_m^2 + L_w I_0^2).$$

In preferred embodiments, the resonant capacitor 22 is chosen to be a small value for two reasons. First, when fully charged, the voltage across a small resonant capacitor 22 will be much higher than the voltage across the first capacitor 16, which is equal to the voltage across the input energy source 12. Second, a small resonant capacitor 22 charges quickly. Thus, the parasitic energy which charges the resonant capacitor 22 can be removed from the transformer 26 quickly, thus shortening the required OFF period and increasing the duty cycle.

The increased duty cycle, in preferred embodiments, enables the forward converter to maintain a substantially constant output voltage over a wider range of input voltages. Since the input voltage, $V_{in}$, times the length of the ON period, $t_{on}$, divided by the length of a complete cycle, $(t_{on} + t_{off})$, equals the output voltage, $V_{out}$, a substantially constant output voltage can be maintained over a wide range of input voltages as $t_{on}$ can be increased, or decreased, to accommodate a desired input voltage.

Figure 2:
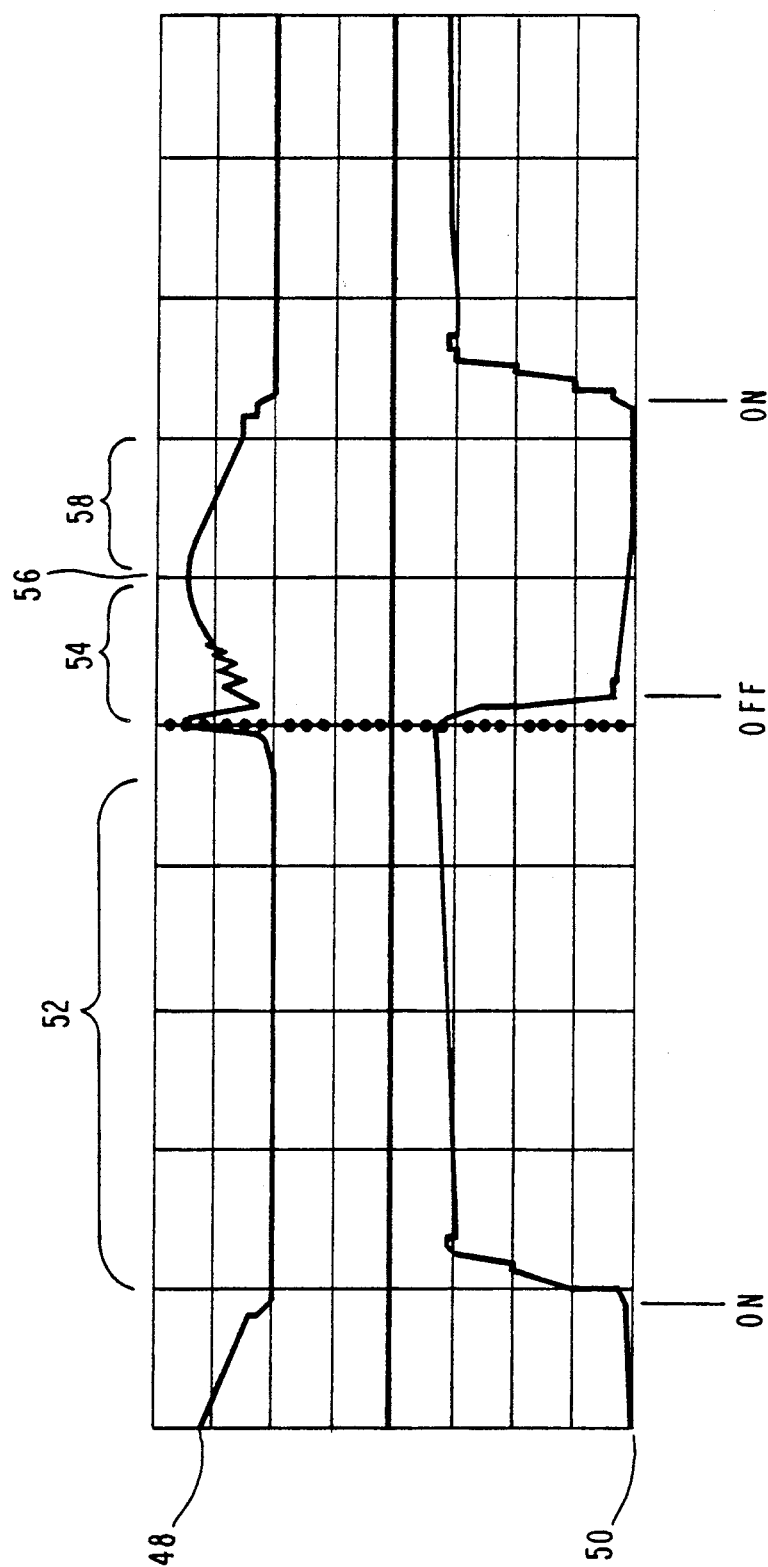
FIG. 2 is a graph of the voltage across the resonant capacitor versus time, and the switch current versus time, for a duty cycle in excess of 50 per cent.

FIG. 2 is a graph of the voltage across the resonant capacitor 22 versus time 48, and the switch current versus time 50, for a duty cycle in excess of 50 per cent. The voltage across the resonant capacitor 22 during the ON period 52 is equal to zero. At the beginning of the OFF period 54, the resonant capacitor 22 is charged by the current flowing in the loop comprising the resonant capacitor 22, the first diode 18, and the primary winding 28. The current results from the parasitic energy remaining in the transformer 26. When the resonant capacitor 22 is fully charged 56, the energy recovered by the resonant capacitor 22 is transferred to the first capacitor 16 during the latter portion of the OFF period 58. The increase in the duty cycle results from the reduced amount of time required to charge the resonant capacitor 22 with the parasitic energy remaining in the transformer 26, and transfer the recovered energy to the first capacitor 16. The duty cycle illustrated is approximately 65 per cent.

Due to the relatively smooth response of the resonant capacitor 22, illustrated in the voltage curve 48, the quasi-resonant circuit causes less electromagnetic interference than other energy recovery methods.

Figure 3:
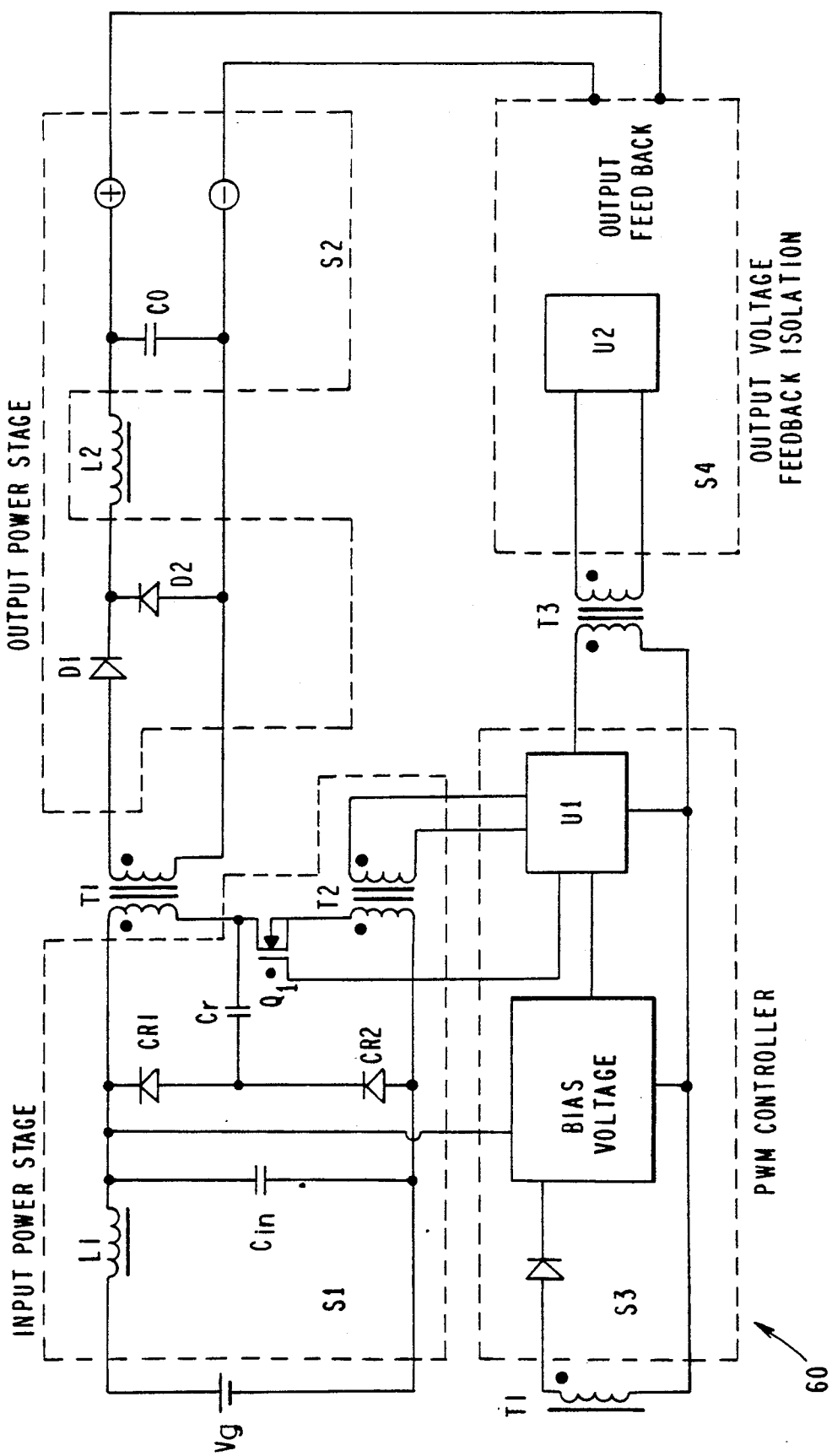
FIG. 3 is a simplified schematic diagram of a preferred embodiment of a forward converter with the quasi-resonant circuit.

FIG. 3 is a simplified schematic diagram of a preferred embodiment of a 75 watt dc-dc forward converter. The design requirements of this embodiment are as follows:

| | |
|---|---|
| Input voltage | 16–50 Vdc |
| Output voltage | 8.0 ± 0.2 Vdc |
| Load current | 0–9.5 Adc |
| Voltage ripple | 80 mV p—p |
| Turn on overshoot | 10 percent maximum |
| Transient load step voltage 0.5 FL to FL | 10 percent maximum |
| Temperature range | −55° C. to +85° C. |

The design parameters are:
$f_s = 250$ kHz
$L_m = 60$ μH
$C_s = 220$ pf
$I_0 = 9.5$ A
$I_m = 0.28$ A
$C_p = 1$ nf
$f_0 = 1.45$ MHz
$VC_{sp} = 62$ V The maximum surge voltage across the transistor switch 24 is:

$$V_{ds} = V_g + VC_{sp} = 50 + 62 = 112 \text{ V}$$

Theoretically,
$D_{max} = 91$ per cent.

The maximum duty cycle is less than the theoretical value due to circuit parasitics and the current mode slope compensation requirement for stable operation of the power supply.

The above-described embodiments are furnished as illustrative of the principles of the invention, and are not intended to define the only embodiment possible in accordance with our teaching. Rather, the invention is to be considered as encompassing not only the specific embodiments shown, but also any others falling within the scope of the following claims.

What is claimed is:

1. A forward converter power supply comprising:
   a transformer having a primary winding coupled to a primary circuit including input terminals adapted for connection to an energy source and a secondary winding coupled to a secondary circuit including output terminals adapted for connection to a load;
   switching means for coupling said energy source to said primary winding during an ON period, and decoupling said energy source from said primary winding an OFF period, said ON and OFF periods alternating at a desired rate and duration during operation of said forward converter power supply, said transformer having parasitic energy during said OFF period; and
   chokeless quasi-resonant circuit means for increasing the duty cycle of said forward converter power supply by reducing the amount of time required to remove said parasitic energy from said transformer during said OFF period.

2. The forward converter power supply of claim 1, wherein said switching means comprises a transistor switch.

3. The forward converter power supply of claim 1, wherein said chokeless quasi-resonant circuit means comprises:
   a first diode, having a first lead and a second lead, said first lead of said diode coupled to a first lead of said primary winding of said transformer and said primary circuit;
   a second diode, having a first lead and a second lead, said first lead of said second diode coupled to said second lead of said first diode, said second lead of said second diode coupled to a first lead of said switching means and said primary circuit;
   a capacitor having a first lead and a second lead, said first lead of said capacitor coupled to a second lead of said primary winding of said transformer and a second lead of said switching means, said second lead of said capacitor coupled to said second lead of a first diode and said first lead of said second diode.

4. The forward converter power supply of claim 3, wherein said switching means comprises a transistor switch.

5. The forward converter power supply of claim 1, wherein said quasi-resonant circuit means comprises:
   a first loop having a first diode, a first lead of said first diode coupled to a first lead of said primary winding of said transformer, and a capacitor, a first lead of said capacitor coupled to a second lead of said primary winding of said transformer and a second lead of said capacitor coupled to a second lead of said diode, such that during an OFF period of said forward converter power supply operation current flows around said first loop charging said capacitor with said parasitic energy in said transformer; and
   a second loop having a second diode, a first lead of said second diode coupled to said second lead of said capacitor and a second lead of said second diode coupled to said primary circuit, a first lead of said capacitor coupled to said second lead of said primary winding of said transformer, said second lead of said primary winding of said transformer coupled to said primary circuit, such that during an OFF period of said forward converter power supply operation, after said capacitor has been substantially fully charged, current flows around said second loop discharging said capacitor and transferring energy from said capacitor to said primary circuit.

6. The forward converter power supply of claim 5, wherein said switching means comprises a transistor switch.

7. An apparatus for increasing the duty cycle of a forward converter power supply, said power supply having a transformer with a primary winding coupled to a primary circuit including input terminals adapted for connection to an energy source and a secondary winding coupled to a secondary circuit including output terminals adapted for connection to a load, said power supply having switching means for coupling said energy source to said primary winding during an ON period, and decoupling said energy source from said primary winding during an OFF period, said ON and OFF periods alternating at a desired rate and duration during operation of said forward converter power supply, said transformer having parasitic energy during said OFF period, comprising chokeless quasi-resonant circuit means for increasing the duty cycle of said forward converter power supply by reducing the amount of time required to remove said parasitic energy from said transformer during said OFF period.

8. The apparatus of claim 7 wherein said chokeless quasi-resonant circuit means is coupled to said primary circuit and said primary winding of said transformer.

9. The apparatus of claim 7, wherein said chokeless quasi-resonant circuit means comprises:
  a first diode, having a first lead and a second lead, said first lead of said first diode coupled to a first lead of said primary winding of said transformer and said primary circuit;
  a second diode, having a first lead and a second lead, said first lead of said second diode coupled to said second lead of said first diode, said second lead of said second diode coupled to a first lead of said switching means and said primary circuit;
  a capacitor having a first lead and a second lead, said first lead of said capacitor coupled to a second lead of said primary winding of said transformer and a second lead of said switching means, said second lead of said capacitor coupled to said second lead of said first diode and said first lead of said second diode.

10. The apparatus of claim 7, wherein said chokeless quasi-resonant circuit means comprises:
  a first loop having a first diode, a first lead of said first diode coupled to a first lead of said primary winding of said transformer, and a capacitor, a first lead of said capacitor coupled to a second lead of said primary winding of said transformer and a second lead of said capacitor coupled to a second lead of said diode, such that during an OFF period of said forward converter power supply operations current flows around said first loop charging said capacitor with said parasitic energy in said transformer; and
  a second loop having a second diode, a first lead of said second diode coupled to said second lead of said capacitor and a second lead of said second diode coupled to said primary circuit, a first lead of said capacitor coupled to said second lead of said primary winding of said transformer, said second lead of said primary winding of said transformer coupled to said primary circuit, such that during an OFF period of said forward converter power supply operation, after said capacitor has been substantially fully charged, current flows around said second loop discharging said capacitor and transferring energy from said capacitor to said primary circuit.

11. A forward converter power supply comprising:
  a transformer having a primary winding coupled to a primary circuit including input terminals adapted for connection to an energy source, said energy source providing an input voltage to said power supply, and a secondary winding coupled to a secondary circuit including output terminals adapted for connection to a load, said power supply providing a desired output to said load;
  switching means for coupling said energy source to said primary winding during an ON period, and decoupling said energy source from said primary winding during an OFF period, said ON and OFF periods alternating at a desired rate and duration during operation of said forward converter power supply, said transformer having parasitic energy during said OFF period; and
  chokeless quasi-resonant circuit means for providing substantially the same desired output from said forward converter power supply while increasing the range of acceptable input voltages.

12. The forward converter power supply of claim 11, wherein said switching means comprises a transistor switch.

13. The forward converter power supply of claim 11, wherein said chokeless quasi-resonant circuit means comprises:
  a first diode, having a first lead and a second lead, said first lead of said first diode coupled to a first lead of said primary winding of said transformer and said primary circuit;
  a second diode, having a first lead and a second lead, said first lead of said second diode coupled to said second lead of said first diode, said second lead of said second diode coupled to a first lead of said switching means and said primary circuit;
  a capacitor having a first lead and a second lead, said first lead of said capacitor coupled to a second lead of said primary winding of said transformer and a second lead of said switching means, said second lead of said capacitor coupled to said second lead said first diode and said first lead to said second diode.

14. The forward converter power supply of claim 13, wherein said switching means comprises a transistor switch.

15. The forward converter power supply of claim 11, wherein said chokeless quasi-resonant circuit means comprises:
  a first loop having a first diode, a first lead of said first diode coupled to a first lead of said primary winding of said transformer, and a capacitor, a first lead of said capacitor coupled to a second lead of said primary winding of said transformer and a second lead of said capacitor coupled to a second lead of said diode, such that during an OFF period of said forward converter power supply operation current flows around said first loop charging said capacitor with said parasitic energy in said transformer; and a second loop having a second diode, a first lead of said second diode coupled to said second lead of said capacitor and a second lead of said second diode coupled to said primary circuit, a first lead of said capacitor coupled to said second lead of said primary winding of said transformer, said second lead of said primary winding of said transformer coupled to said primary circuit, such that during an OFF period of said forward converter power supply operation, after said capacitor has been substantially fully charged, current flows around said second loop discharging said capacitor and transferring energy from said capacitor to said primary circuit.

16. The forward converter power supply of claim 15, wherein said switching means comprises a transistor switch.

17. An apparatus for operating a forward converter power supply over a wider range of input voltages while providing substantially the same desired output, said power supply having a transformer with a primary winding coupled to a primary circuit including light terminals adapted for connection to an energy source, said energy source providing an input voltage, and a secondary winding coupled to a secondary circuit including output terminals adapted for connection to a load, said power supply providing a desired output to said load, said power supply having switching means for coupling said energy source to said primary winding during an ON period, and decoupling said energy source from said primary winding an OFF period, said ON and OFF periods alternating at a desired rate and duration during operation of said forward converter power supply, said transformer having parasitic energy during said OFF period, comprising chokeless quasi-resonant circuit means for operating said power supply over a wider range of input voltages while providing substantially the same desired output.

18. The apparatus of claim 17 wherein said chokeless quasi-resonant circuit means is coupled to said primary circuit and said primary winding of said transformer.

19. The apparatus of claim 17, wherein said chokeless quasi-resonant circuit means comprises:
a first diode, having a first lead and a second lead, said first lead of said first diode coupled to a first lead of said primary winding of said transformer and said primary circuit;
a second diode, having a first lead and said second lead, said first lead of said second diode coupled to said second lead of said first diode, said second lead of said second diode coupled to a first load of said switching means and said primary circuit;
a capacitor having a first lead and a second lead, said first lead of said capacitor coupled to a second lead of said primary winding of said transformer and a second lead of said switching means, said second lead of said capacitor coupled to said second lead of said first diode and said first lead of said second diode.

20. The apparatus of claim 17, wherein said chokeless quasi-resonant circuit means comprises:
a first loop having a first diode, a first lead of said first diode coupled to a first lead of said primary winding of said transformer, and a capacitor, a first lead of said capacitor coupled to a second lead of said primary winding of said transformer and a second lead of said capacitor coupled to a second lead of said diode, such that during an OFF period of said forward converter power supply operation current flows around said first loop charging said capacitor with said parasitic energy in said transformer; and
a second loop having a second diode, a first lead of said second diode coupled to said second lead of said capacitor and a second lead of said second diode coupled to said primary circuit, a first lead of said capacitor coupled to said second lead of said primary winding of said transformer; said second lead of said primary winding of said transformer coupled to said primary circuit, such that during an OFF period of said forward converter power supply operation, after said capacitor has been substantially fully charged, current flows around said second loop discharging said capacitor and transferring energy from said capacitor to said primary circuit.

21. A method for increasing the duty cycle of a forward converter power supply without need of a choke, said power supply coupled to an energy source, said power supply having a transformer with a primary winding coupled to a primary circuit and a secondary winding coupled to a secondary circuit, said power supply having ON periods and OFF periods of desired durations, alternating between said ON period and said OFF period, at a desired rate, said transformer containing parasitic energy caused by leakage inductance and magnetizing inductance, comprising the steps of:
charging a capacitor, during said OFF period, with said parasitic energy from said transformer, said capacitor being charged such that a voltage measured across said charged capacitor is substantially greater than a voltage measured across said energy source coupled to said power supply; and
substantially discharging said capacitor, during said OFF period.

22. The method of claim 21, wherein said energy discharged from said capacitor is recovered.

23. The method of claim 21, wherein said charging said capacitor comprises the steps of constructing a first loop having a first diode, coupling a first lead of said first diode to a first lead of said primary winding of said transformer, coupling a first lead of said capacitor to a second lead of said primary winding of said transformer and coupling a second lead of said capacitor to a second lead of said diode, such that during an OFF period of said forward converter power supply operation current flows around said first loop charging said capacitor with said parasitic energy in said transformer.

24. The method of claim 22, wherein said discharging said capacitor to recover energy comprises the steps of constructing a second loop having a second diode, coupling a first lead of said second diode to said second lead of said capacitor and coupling a second lead of said second diode to said primary circuit, coupling a first lead of said capacitor to said second lead of said primary winding of said transformer, coupling said second lead of said primary winding of said transformer to said primary circuit, such that during an OFF period of said forward converter power supply operation, after said capacitor has been substantially fully charged, current flows around said second loop discharging said capacitor and transferring energy from said capacitor to said primary circuit.

25. A method for operating a forward converter power supply over a wider range of input voltages while providing substantially the same desired output without need of a choke, said power supply coupled to an energy source, said energy source providing an input voltage, said power supply having a transformer with a primary winding coupled to a primary circuit and a secondary winding coupled to a secondary circuit including output terminals adapted for connection to a load, said power supply providing a desired output to said load, said power supply having ON periods and OFF periods of desired durations, alternating between said ON period and said OFF period, at a desired rate, said transformer containing parasitic energy caused by leakage inductance and magnetizing inductance, comprising the steps of:

charging a capacitor, during said OFF period, with said parasitic energy from said transformer, said capacitor being charged such that a voltage measured across said charged capacitor is substantially greater than a voltage measured across said energy source coupled to said power supply; and substantially discharging said capacitor, during said OFF period.

26. The method of claim 25, wherein said energy discharged from said capacitor is recovered.

27. The method of claim 25, wherein said charging said capacitor comprises the steps of constructing a first loop having a first diode, coupling a first lead of said first diode to a first lead of said primary winding of said transformer, coupling a first lead of said capacitor to a second lead of said primary winding of said transformer and coupling a second lead of said capacitor to a second lead of said diode, such that during an OFF period of said forward converter power supply operation current flows around said first loop charging said capacitor with said parasitic energy in said transformer.

28. The method of claim 26, wherein said discharging said capacitor to recover energy comprises the steps of constructing a second loop having a second diode, coupling a first lead of said second diode to said second lead of said capacitor and coupling a second lead of said second diode to said primary circuit, coupling a first lead of said capacitor to said second lead of said primary winding of said transformer, coupling said second lead of said primary winding of said transformer to said primary circuit, such that during an OFF period of said forward converter power supply operation, after said capacitor has been substantially fully charged, current flows around said second loop discharging said capacitor and transferring energy from said capacitor to said primary circuit.

29. A chokeless quasi-resonant circuit adapted for use with a forward converter, comprising:
means for increasing a duty cycle of said forward converter; and
means for coupling said means for increasing the duty cycle to said forward converter.

30. A chokeless quasi-resonant circuit adapted for use with a forward converter having an input voltage and a desired output, comprising:
means for increasing the range of input voltages to said forward converter while maintaining substantially the same desired output; and
means for coupling said means for increasing said range of input voltages, to said forward converter.

31. A forward converter power supply comprising:
a transformer having a primary winding coupled to a primary circuit including input terminals adapted for connection to an energy source and a second winding coupled to a secondary circuit including output terminals adapted for connection to a load;
switching means for coupling said energy source to said primary winding during an ON period, and decoupling said energy source form said primary winding an OFF period, said ON and OFF periods alternating at a desired rate and duration during operation of said forward converter power supply, said transformer having parasitic energy during said OFF period; and
quasi-resonant circuit means with a capacity for increasing the duty cycle of said forward converter power supply for operation in excess of 75 per cent by reducing the amount of time required to remove said parasitic energy from said transformer during said OFF period.

32. An apparatus for increasing the duty cycle of a forward converter power supply for operation in excess of 75 per cent, said power supply having a transformer with a primary winding coupled to a primary circuit including input terminals adapted for connection to an energy source and a secondary winding coupled to a secondary circuit including output terminals adapted for connection to a load, said power supply having switching means for coupling said energy source to said primary winding during an ON period, and decoupling said energy source from said primary winding during an OFF period, said ON and OFF periods alternating at a desired rate and duration during operation of said forward converter power supply, said transformer having parasitic energy during said OFF period, said apparatus also comprising quasi-resonant circuit means for increasing the duty cycle of said forward converter power supply by reducing the amount of time required to remove said parasitic energy from said transformer during said OFF period.

33. A method for increasing the duty cycle of a forward converter power supply for operation in excess of 75 per cent, said power supply coupled to an energy source, said power supply having a transformer with a primary winding coupled to a primary circuit and a secondary winding coupled to a secondary circuit, said power supply having ON periods and OFF periods of desired durations, alternating between said ON period and said OFF period, at a desired rate, said transformer containing parasitic energy caused by leakage inductance and magnetizing inductance, comprising the steps of:

charging a capacitor, during said OFF period, with said parasitic energy from said transformer, said capacitor being charged such that a voltage measured across said charged capacitor is substantially greater than a voltage measured across said energy source coupled to said power supply; and substantially discharging said capacitor, during said OFF period.

34. A quasi-resonant circuit adapted for use with a forward converter, comprising:
means for increasing a duty cycle of said forward converter for operation in excess of 75 per cent; and
means for coupling said means for increasing the duty cycle to said forward converter.

* * * * *